United States Patent [19]

Barrow

[11] 4,226,089
[45] Oct. 7, 1980

[54] WASTE HEAT RECOVERY DEVICE

[76] Inventor: Billy E. Barrow, 2434 Funston St., Hollywood, Fla. 33020

[21] Appl. No.: 920,791

[22] Filed: Jun. 30, 1978

[51] Int. Cl.³ .................. F25B 43/02; F25B 7/00; F25B 47/00; F25B 27/02
[52] U.S. Cl. ............................ 62/84; 62/79; 62/85; 62/238; 62/512
[58] Field of Search .......... 62/79, 238 E, 468, 473, 62/512, 117, 84, 85; 165/164, 165

[56] References Cited

U.S. PATENT DOCUMENTS

| | | | |
|---|---|---|---|
| 2,418,446 | 4/1947 | Anderson | 62/238 E |
| 3,188,829 | 6/1965 | Siewert et al. | 62/238 E |
| 3,365,899 | 1/1968 | Cuny et al. | 62/115 |
| 3,513,663 | 5/1970 | Martin, Jr. et al. | 62/238 E |
| 3,553,974 | 1/1971 | Osborne | 62/512 |
| 3,989,183 | 11/1976 | Gustafsson | 62/238 E |

Primary Examiner—Lloyd L. King
Attorney, Agent, or Firm—Eugene F. Malin; Barry L. Haley; Philip R. Wadsworth

[57] ABSTRACT

A cascade heat exchange system in which the heat given off in condensing a superheated vaporized refrigerant is used to vaporize carbon dioxide and to add sensible heat to a water system. The superheated discharge vapor of a refrigeration system is pumped into the shell side of a heat exchange vessel, where evaporative tube bundles absorb heat from the refrigerant. In one tube bundle, liquid carbon dioxide flowing through the tubes is vaporized. Another tube bundle receiving heat from the refrigerant is used to heat water for industrial use. The vaporized refrigerant leaving the heat exchange vessel shell having become desuperheated and de-oiled since giving off heat to the tube bundles is then condensed for continued use in the refrigeration cycle.

3 Claims, 3 Drawing Figures

WASTE HEAT RECOVERY DEVICE

BACKGROUND OF THE INVENTION

This invention relates to the operation of a heat exchanger in combination with a refrigeration system in which a superheated vaporized refrigerant is discharged into the shell side of the heat exchanger for the purpose of vaporizing carbon dioxide or heating other fluids for commercial use.

Heretofore, industries that use vaporized liquid carbon dioxide ($CO_2$), such as the soft drink industry, have used electric or other type heaters to vaporize the $CO_2$ used for carbonation of their drinks. In addition, these same plants use large amounts of hot water in their operation. Finally, these same plants have large refrigeration units which give off waste heat to the atmosphere as the refrigerant is condensed. The present invention is directed to a system in which recovered waste heat from the refrigeration system is used to replace the power now used to vaporize carbon dioxide or heat other fluids.

SUMMARY

The present invention provides a heat exchanger in combination with a refrigeration system in which a superheated vaporized refrigerant is discharged into the shell side of the heat exchanger. This heat exchanger is employed to recover waste heat from the refrigeration system and to use this recovered energy to replace the electric power now used to vaporize carbon dioxide or heat other fluids in a commercial plant.

Heretofore, industries that use vaporized liquid carbon dioxide ($CO_2$), such as the soft drink industry, have used electric or other type heaters to vaporize the $CO_2$ used for carbonation of their drinks. In addition, these same plants use large amounts of hot water in their operation. Finally, these same plants have large refrigeration units which give off waste heat to the atmosphere as the refrigerant is condensed. The present invention is directed to a system in which the power used to vaporize $CO_2$ and to heat water is saved by the utilization of the waste heat from a refrigeration unit.

In the present invention, a superheated vaporized refrigerant is discharged into the shell side of a heat exchanger prior to entering the normal condenser. A tube bundle, located in the flow path of the superheated vapor within the heat exchanger, absorbs the heat from the refrigerant and vaporizes the liquid $CO_2$ flowing through the tubes. Another tube bundle within the shell is used to raise the temperature of water flowing through these tubes. Other tube bundles may be used to remove heat from the shell side fluid. The resulting desuperheated vapor is then condensed for further use in the refrigeration cycle.

The desuperheating of the refrigerant vapor will also cause the oil in the system to coalesce because of the lower vapor temperature in the shell. This oil will therefore separate from the vapor and settle to the bottom of the shell where it can be removed and reused.

The desuperheated vapor also reduces fouling of the condenser tubes and reduces the electric consumption of the compressor by reducing the pressure seen by the discharge of the compressor.

The present invention may be of either a vertical or horizontal shell configuration.

It is therefore the principal object of this invention to provide means to recover waste heat from a refrigeration system and use this recovered energy to vaporize carbon dioxide or heat other fluids.

It is a further object of this invention to de-oil the desuperheated vapor, and to remove and reuse this oil in the system.

It is another object of this invention to reduce fouling of the condenser tubes by reducing the pressure of the refrigerant at the discharge of the compressor.

In accordance with these and other objects which will be apparent hereinafter, the instant invention will now be described with particular reference to the accompanying drawings.

DESCRIPTION OF PREFERRED EMBODIMENTS OF THE INVENTION

Figure 1:
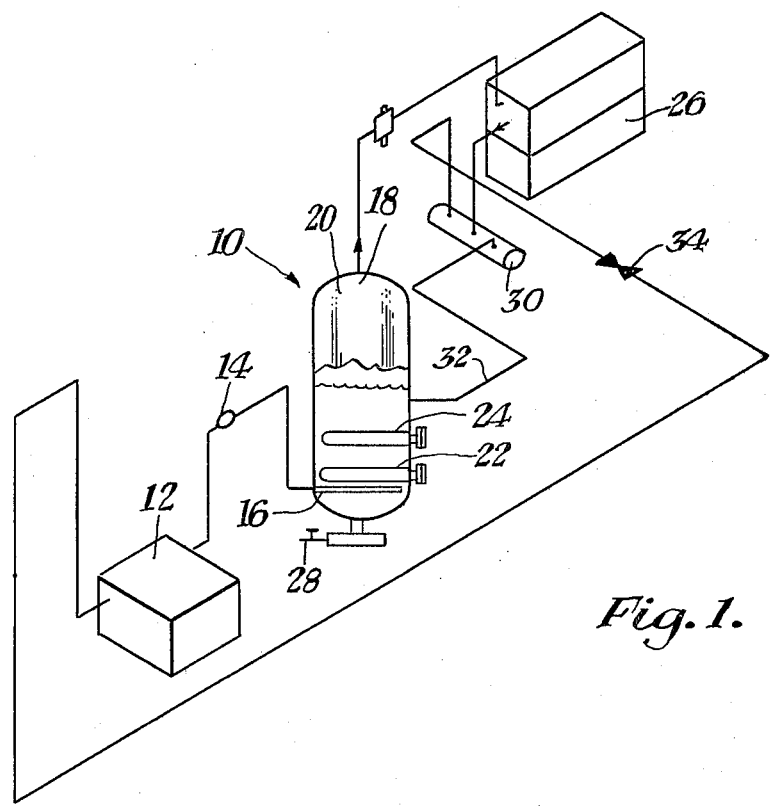
FIG. 1 is a perspective view of the present invention shown in connection with a refrigeration unit.
Figure 2:
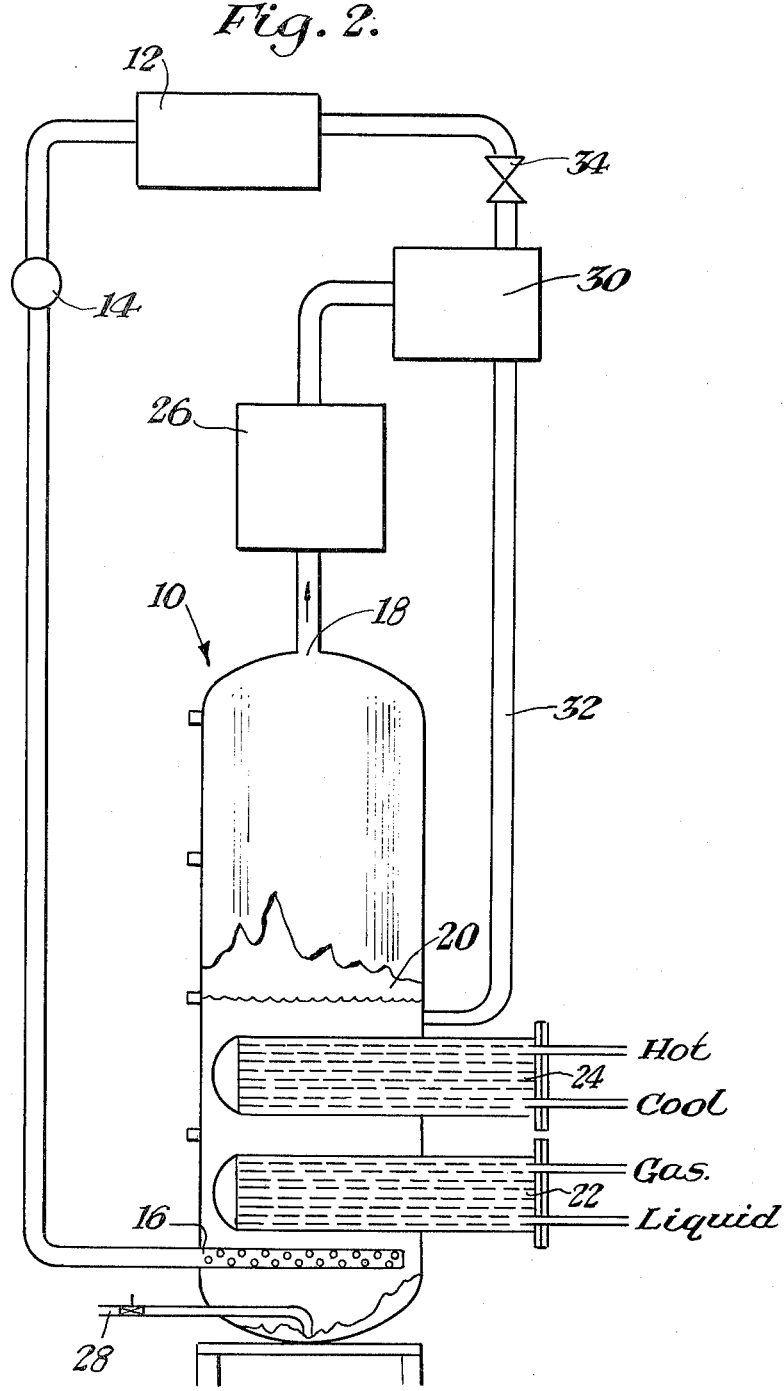
FIG. 2 is an elevational view, partially in vertical section, of the present invention, shown with a refrigeration system.

This invention relates to a new and improved means and method of recovering waste heat from a refrigeration system and using this recovered heat to replace the energy now used to vaporize carbon dioxide or heat or other fluids in systems found in such industries as the soft drink industry. As illustrated in FIGS. 1 and 2, a waste heat recovery heat-exchanger, indicated by the general reference numeral 10, receives superheated discharge vapor from a refrigeration evaporator 12 through a compressor 14. A low pressure vapor, discharged from the evaporator 12, is increased in pressure by the compressor 14 to a superheated vaporized refrigerant and is then discharged into the shell side of a heat exchanger 10 through an inlet 16. The heat exchanger inlet 16 may extend into the heat exchanger 10 as illustrated in FIG. 1 to distribute the incoming vapor more evenly throughout the heat exchanger shell.

The superheated refrigerant vapors entering the heat-exchanger shell 20 give up heat to colder fluids inside tube bundles 22 and 24. The tube bundles may carry different fluids, such as carbon dioxide in tube bundle 22 and water in tube bundle 24. With the present invention liquid carbon dioxide in a tube bundle 22 will be completely vaporized, thus saving the energy now used to vaporize carbon dioxide. Also, the superheated refrigerant vapors will heat incoming water sufficiently to provide fuel savings over the present methods of adding heat to the water.

After transferring heat to the tube bundles 22 and 24, the superheated refrigerant vapors become desuperheated and de-oiled. A portion of this desuperheated vapor is condensed in the heat exchanger shell 20 and remains in the heat exchanger shell 20 along with the oil that has separated from the vapors. The remaining portion of the desuperheated vapor egresses the heat exchanger through outlet 18 to an evaporative condenser 26. Oil that collects in the heat exchanger shell 20 may be periodically removed through a drain line 28 and can be filtered and reused.

The vapor entering the evaporative condenser 26 will reduce fouling of the condenser tubes since it is desuperheated. This desuperheated vapor also reduces the discharge pressure, which will reduce the load on the compressor 14 thereby saving energy. Further, the desuperheated vapor will also reduce the load on the fans and pumps (not illustrated) of the evaporative condenser, saving even more energy.

The high pressure liquid refrigerant which leaves the evaporative condenser 26 flows to a receiver 30 from which it may return to the heat exchanger shell through a connecting pipe 32 or any flow through an expansion valve 34 becoming a low pressure liquid to the refrigeration evaporator 12 for cooling a space. The refrigerant after passing through the evaporator 12 becomes a low pressure vapor at the suction of the compressor 14, and the cycle starts anew.

Figure 3:
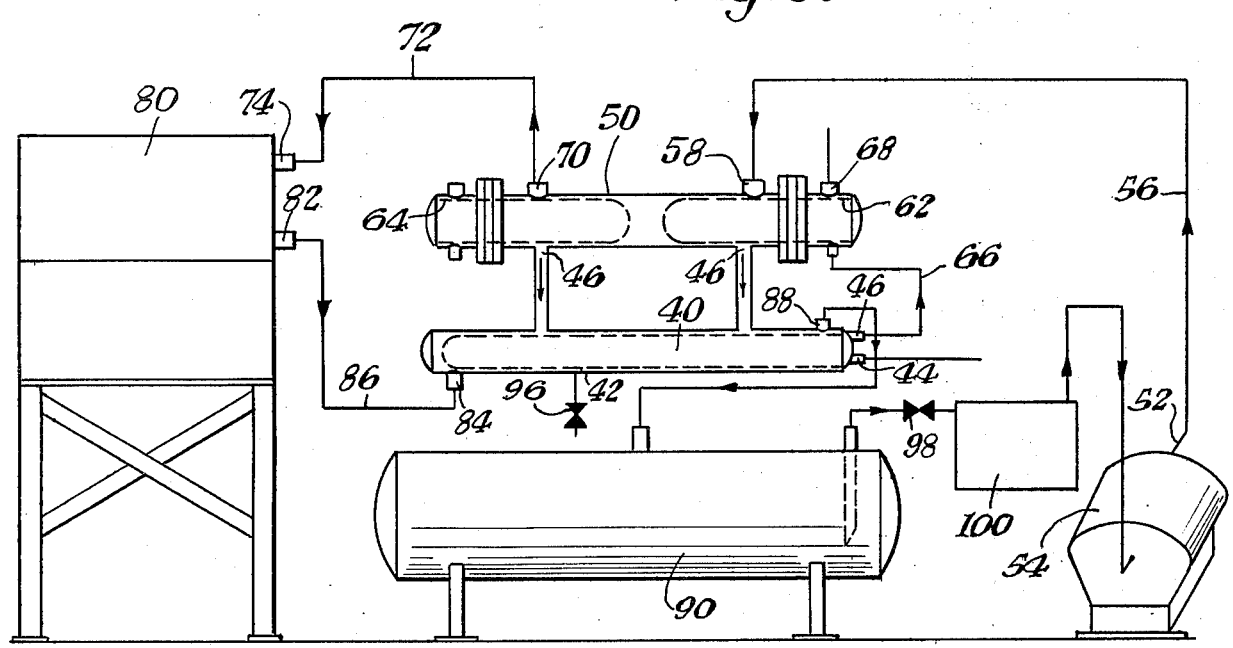
FIG. 3 is a fragmentary vertical section of another embodiment of the present invention shown connected to a refrigeration system.

FIG. 3 illustrates another embodiment in which a subcooling section 40 is connected to a heat exchanger 50 by piping 46. The subcooling section 40 includes a tube bundle 42, having an inlet 44 and an outlet 46 through which a fluid, such as carbon dioxide flows to subcool the refrigerant and thus recover the energy lost due to flash gas where a warmer refrigerant flashes off vapor upon entering a cooler space. Thus, by subcooling the refrigerant prior to entering the evaporator 100, it will reduce flashing to a vapor, and a considerable amount of energy is saved.

Referring specifically to FIG. 3, the waste heat recovery system of the present invention operates as explained hereinafter as a high pressure refrigerant vapor flows from the discharge 52 of a compressor 54 through piping 56 to the inlet 58 of the shell side of the heat exchanger 50. Using the heat from the refrigerant vapor, cooler fluid passing through tube bundles 62 and 64 increases in temperature. During the process of giving up heat to the fluids in the tube bundles 62 and 64, part of the refrigerant vapor is condensed and flows through the piping 46 to the subcooling section 40 of the heat exchanger 50. The subcooling section 40 has a tube bundle 42 disposed within it. The tube bundle 42 has the same liquid flowing through it as flows through the tube bundle 62 in the heat exchanger 50. Tube bundle 42 is connected to tube bundle 62 by piping 66. When carbon dioxide flows through tube bundles 42 and 62, it will be completely vaporized at the outlet 68 of the tube bundle 62.

The remaining portion of refrigerant vapor flowing through the heat exchanger 50 that is not condensed by the tube bundles 62 and 64 is discharged through the outlet 70 of the shell side of the heat exchanger 50. This high pressure refrigerant vapor flows through piping 72 and inlet 74 to the evaporative condenser 80 where it is condensed to a high pressure liquid which is discharged through the outlet 81 of the evaporative condenser 80. The high pressure liquid refrigerant then flows through the piping 86 and inlet 84 to the shell side of the subcooling section 40 of the heat exchanger 50 where it mixes with the refrigerant condensed by the tube bundles 62 and 64. The oil that is separated from the refrigerant may be periodically removed through drain 96.

The mixed liquid refrigerant then flows through out 88, piping 92, and inlet 94 into a receiver 90. The high pressure liquid refrigerant is then expanded as it passes through an expansion device 98 and finally this low pressure liquid refrigerant removes heat in the evaporator 100 from the space to be cooled. Thus, the low pressure vapor enters the compressor 54 and the cycle starts anew.

While the present invention has been described with reference to illustrative embodiments, it will be apparent that various modifications thereof can be practiced based on the above disclosure without departing from the spirit and scope of the invention embodied within the claims.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method for using waste heat from a refrigeration system comprising the steps of:
   (a) discharging superheated vaporized refrigerant from a refrigeration compressor into the shell side of a heat exchanger for use in raising the temperature of useful fluids;
   (b) impinging said superheated vaporized refrigerant onto a plurality of tube bundles disposed within said heat exchanger thus transferring heat from said superheated vaporized refrigerant into useful liquids being transported through said tube bundles causing said liquids to increase in temperature and said superheated vaporized refrigerant to become desuperheated vaporized refrigerant,
   (c) discharging said desuperheated vaporized refrigerant into an evaporative condensor for condensation of said vapor into a liquid;
   (d) moving said liquid refrigerant through an expansion means for decreasing the pressure of said liquid refrigerant;
   (e) moving said expanded liquid refrigerant through an evaporator for transferring heat from a space to be cooled to said refrigerant for further useful purposes in heating fluids; and
   (f) removing oil from said shell side of said heat exchanger that has separated out from said superheated vaporized refrigerant during desuperheating.

2. The method as set forth in claim 1 wherein said fluid being transported through one tube bundle is carbon dioxide, said carbon dioxide being completely vaporized in said tube bundle.

3. The method as set forth in claim 1 wherein said heat transferred from said space to be cooled is transferred to said liquids being transported through said tube bundles.

* * * * *